May 11, 1965        G. N. SMITH        3,182,470
SEALING DEVICE
Filed April 8, 1963        2 Sheets-Sheet 1
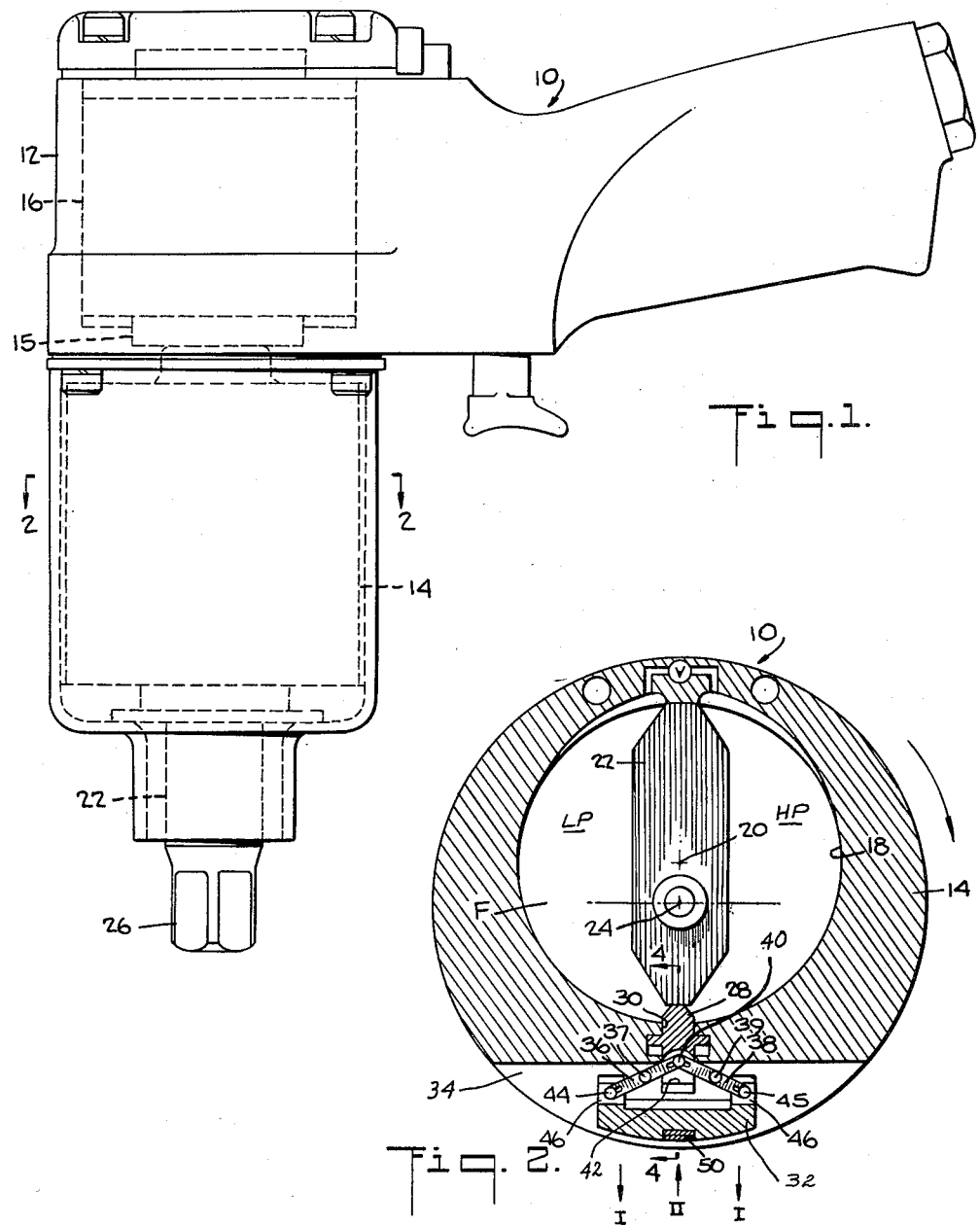
INVENTOR.
GEORGE N. SMITH
BY R. J. Leek Jr.
ATTORNEY INVENTOR.
GEORGE N. SMITH
BY R. J. Leek Jr.
ATTORNEY United States Patent Office 3,182,470
Patented May 11, 1965

3,182,470
SEALING DEVICE
George N. Smith, Bedminster, N.J., assignor to Ingersoll-Rand Company, New York, N.Y., a corporation of New Jersey
Filed Apr. 8, 1963, Ser. No. 271,443
5 Claims. (Cl. 64—26)

This invention relates to impulse tools and more particularly to an improved sealing device for such impulse tools.

Heretofore, impulse tools have been of two types (namely, impulse wrenches and sources of fluid impulses), both types being disclosed in United States patent applications Serial No. 115,714, filed June 8, 1961, and now abandoned by D. K. Skoog; Serial No. 158,838, filed December 12, 1961, now Patent No. 3,116,617 by D. K. Skoog; and Serial No. 244,151, filed December 12, 1962, by D. K. Skoog, et al. and assigned to the same assignee as the present application.

When the impulse tool is employed as an impulse wrench for applying a predetermined torque to an object, such as a threaded fastener, the impulse tool comprises:

(a) Housing means adapted to contain a fluid (such as oil), (b) Spindle means in the housing means and in the fluid, (c) Drive means operatively associated with one of the housing means and the spindle means for causing relative rotary movement between the housing means and the spindle means, (d) The other of the housing means and the spindle means being adapted to engage the fastener, (e) The spindle means being operable during a portion of each revolution of the relative rotary movement to dynamically seal off a portion of the fluid so that the pressure in that portion of the fluid and on the spindle means increases thereby causing the other of the housing means and the spindle means to rotate with respect to the one and to apply a torque to the object.

When the impulse tool is utilized as apparatus connected to a conventional tool for driving the tool by fluid impulses, the apparatus comprises:

(a) A stationary casing means, (b) Housing means within the casing means and adapted to contain a fluid (such as oil), (c) Spindle means mounted in the housing means and in the fluid, (d) One of the spindle means and housing means being secured to the casing means, (e) One of the spindle means and housing means being provided with passage means in communication with the other of the spindle means and housing means extending through the one and to the tool, (f) Drive means connected to the other of the housing means and spindle means for causing rotation of the other with respect to the casing means, (g) The spindle means being operative during a portion of each revolution of the relative rotation to dynamically seal off a portion of the fluid so that the pressure in that portion of the fluid and on the spindle means increases thereby causing a pulse of fluid to flow through the passage means to the tool.

In such conventional impulse tools leakage through the spindle means from the high pressure side of the fluid cavity in the housing means (during impulsing) to the low pressure side of the fluid cavity effects the maximum torque output of the impulse tool.

It is the general object of the present invention to avoid and overcome the foregoing and other difficulties of and objections to prior art practices by the provision of an improved sealing device for an impulse tool which sealing device substantially eliminates leakage (through the spindle means during impulsing) from the high pressure side of the fluid cavity to the low pressure side of the fluid cavity with attendant increased maximum torque output of the impulse tool and also provides improved porting between the high pressure and low pressure portions of the impulse tool.

The aforesaid objects of the present invention, and other objects which will become apparent as the description proceeds, are achieved by providing an improved sealing device for an impulse tool having a housing means adapted to contain a fluid, spindle means in the housing means and in the fluid and drive means operatively associated with one of the housing means and the spindle means for causing relative rotary movement between the housing means and the spindle means. This sealing device comprises a sealing member reciprocable in the one, mass means reciprocable in the one and movable outwardly in response to centrifugal force caused by the rotation of the one and operating means connected to the sealing member and the mass means and operable by movement of the mass means in the one to force the sealing member into sealing engagement with the other of the housing means and the spindle means.

For a better understanding of the present invention, reference should be had to the accompanying drawings, wherein like numerals of reference indicate similar parts throughout the several views and wherein:

FIG. 1 is a longitudinal view of an impulse tool wherein the inner housing is the rotating driven member and incorporating the improved sealing device of the present invention in such inner housing;

FIG. 2 is a horizontal sectional view along the line 2—2 of FIG. 1 in the direction of the arrows;

Figure 3:
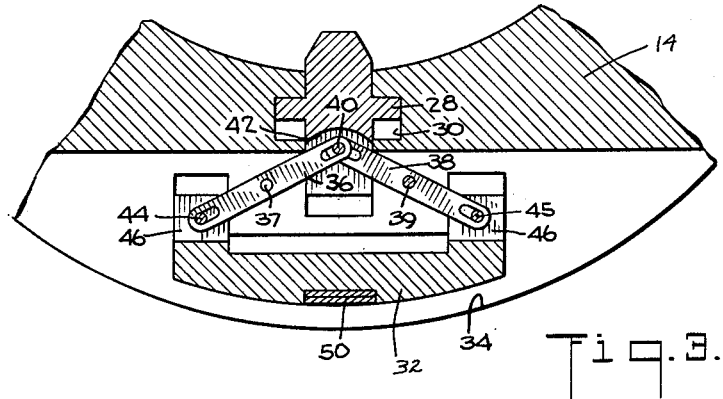
FIG. 3 is an enlarged fragmentary view of a portion of FIG. 2.

Although the principles of the present invention are broadly applicable to sealing devices for fluid operated tools, the present invention is particularly adapted for use in conjunction with impulse tools utilized as impulse wrenches and as a source of fluid impulses and hence it has been so illustrated and will be so described.

With specific reference to the form of the present invention illustrated in the drawings, and referring particularly to FIG. 1, an impulse tool of the type disclosed in the above-mentioned U.S. application Serial No. 158,838 now Patent No. 3,116,617 is indicated generally by the reference numeral 10.

Since the impulse tool 10 per se forms no part of the present invention it is deemed sufficient to say that such impulse tool 10 has a casing means, such as an outer casing 12 (FIG. 1), and a housing means, such as the inner housing 14 (FIGS. 1-4). This inner housing 14 is provided wtih an eccentric cavity 18 (FIG. 2) adapted to contain a fluid, such as oil F. Drive means, such as an air motor 16 (FIG. 1) or the like, is connected by a coupling means 15 to one of the inner housing 14 and spindle means (such as spindle 22, FIGS. 1, 2, rotatably mounted in the inner housing 14). In this case (FIGS. 1-4) the inner housing 14 is driven by the air motor 16 for causing rotation of the inner housing 14 with respect to the outer casing 12. The other of the inner housing 14 and spindle 22 (in this case the spindle 22) is connectable by means of a square drive 26 (FIG. 1) to an object, such as a threaded fastener (not shown). The center of the eccentric cavity 18 is at 20 (FIG. 2) and the center of rotation of the inner housing 14 and spindle 22 is at 24.

Sealing device

Referring now to FIG. 2, the improved sealing device of the present invention has a sealing member 28 (FIGS. 2–4), reciprocable in a sealing member slot 30 in the inner housing 14. Mass means, such as the centrifugal weight 32 (FIGS. 2–4) is reciprocable in a centrifugal weight slot 34 in the inner housing 14 and is movable outwardly in response to the centrifual force caused by the rotation of the inner housing 14. Operating means are connected to the sealing member 28 and the centrifugal weight 32 and are operable by movement of the centrifugal weight 32 to force the sealing member 28 forwardly in the sealing member slot 30 into sealing engagement with the spindle 22.

Figure 4:
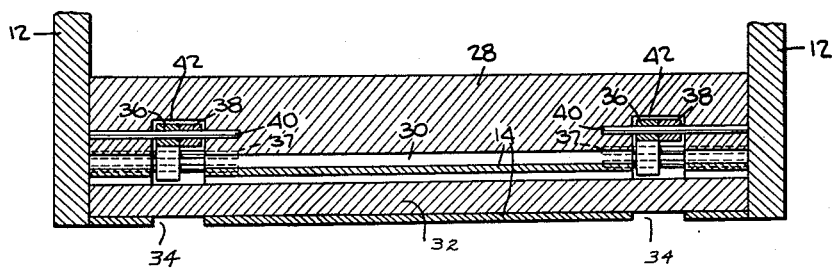
FIG. 4 is a vertical sectional view along the line 4—4 of FIG. 2.

Such operating means comprises two pairs of levers 36, 38 pivoted at 37, 39, FIGS. 2–4. The levers 36, 38 are pivotably connected together at one end and to the sealing member 28 by a pin 40, the sealing member 28 being provided with a clearance slot 42 to permit rotative movement of the levers 36, 38. In turn the other ends of the levers 36, 38 are pivotably pinned at 44, 45 to the centrifugal weight 32, the ends of the levers 36, 38 being disposed in clearance slots 46 in the centrifugal weight 32.

It will be noted from FIGS. 2–4 that the centrifugal weight slot 34 in the inner housing 14 permits the movement of the operating means.

Operation

As the inner housing 14 is rotated by the air motor 16 in the direction of the arrow in FIG. 2, the centrifugal force acts on the centrifugal weight 32. The force I through the above described operating means causes a reactive force II to force the sealing member 28 into sealing engagement with the spindle 22. After the fluid impulse is achieved as explained in the above-mentioned U.S. patent application Serial No. 158,838 rotation of the spindle 22 is interrupted and a return means, such as the return spring 50 (FIGS. 2, 3) reseats the centrifugal weight 32 in the upper end, as viewed in FIGS. 2 and 3, of the centrifugal weight slot 34 with resultant retraction of the sealing member 28 from sealing engagement with the spindle 22 and resultant large porting for high pressure oil exhaustion from the high pressure portion HP of the cavity 18 to the low pressure portion LP of the cavity 18.

Figure 5:
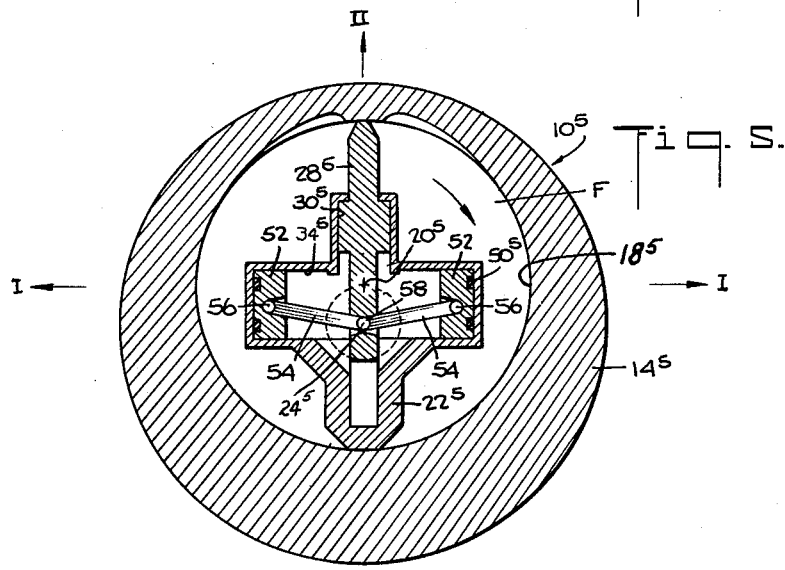
FIG. 5 is a view similar to FIG. 2 of an impulse tool wherein the spindle is the rotating driven member and incorporating the improved sealing device of the present invention in the spindle.

It will be understood by those skilled in the art that alternatively as shown in FIG. 5 that the spindle $22^5$ may rotate and the sealing device may be carried by such spindle $22^5$. In this embodiment two centrifugal weights 52 are connected by levers 54 pinned to the weights 52 at 56 and pinned together and to the sealing member $28^5$ at 58.

It will be recognized by those skilled in the art that the objects of the present invention have been achieved by providing an improved sealing device for an impulse tool (employed as either an impulse wrench or as a source of fluid impulses), the improved sealing device substantially eliminating leakage through the spindle during impulsing thereby increasing the maximum torque output of the impulse tool. In addition, the improved sealing device provides improved porting between the high pressure and low pressure portions of the impulse tool.

While in accordance with the patent statutes a preferred and alternative embodiment of the present invention have been illustrated and described in detail, it is to be particularly understood that the invention is not limited thereto or thereby.

I claim:
1. An improved sealing device for an impulse tool having a housing means adapted to contain a fluid, spindle means in said housing means and in said fluid and drive means operatively associated with one of said housing means and said spindle means for causing relative rotary movement between said housing means and said spindle means, said sealing device comprising:
    (a) a sealing member reciprocable in said one,
    (b) mass means reciprocable toward and away from said one and movable outwardly in response to centrifugal force caused by the rotation of said one and
    (c) operating means connected to said sealing member and said mass means and operable by movement of said mass means away from said one to force said sealing member into sealing engagement with the other of said housing means and said spindle means during a portion of each revolution of said one to substantially eliminate leakage between said one and said other to impulse the other,
    (d) said sealing member being movable away from said other after the impulsing operation to provide resultant large porting between said one and said other.
2. The improved sealing device recited in claim 1 and having return means associated with said mass means for retracting said sealing member after the impulsing operation.
3. The improved sealing device recited in claim 1 wherein said operating means comprises a direction reversing mechanism.
4. An improved sealing device for an impulse tool having a housing means adapted to contain a fluid, spindle means in said housing means and in said fluid and drive means operatively associated with said housing means for causing relative rotary movement between said housing means and said spindle means, said sealing device comprising:
    (a) a sealing member reciprocable in said housing means,
    (b) mass means reciprocable toward and away from said housing means and movable outwardly in response to centrifugal force caused by the rotation of said housing means and
    (c) operating means connected to said sealing member and said mass means and operable by movement of said mass means away from said housing means to force said sealing member into sealing engagement with said spindle means during a portion of each revolution of said housing means to substantially eliminate leakage between said housing means and said spindle means to impulse said spindle means,
    (d) said sealing member being movable away from said spindle means after the impulsing operation to provide resultant large porting between said housing means and said spindle means.
5. An improved sealing device for an impulse tool having a housing means adapted to contain a fluid, spindle means in said housing means and in said fluid and drive means operatively associated with said spindle means for causing relative rotary movement between said housing means and said spindle means, said sealing device comprising:
    (a) a sealing member reciprocable in said spindle means,
    (b) mass means reciprocable toward and away from said spindle means and movable outwardly in response to centrifugal force caused by the rotation of said spindle means, and
    (c) operating means connected to said sealing member and said mass means and operable by movement of said mass means away from said spindle means to force said sealing member into sealing engagement with said housing means during a portion of each revolution of said spindle means to substantially eliminate leakage between said spindle means and said housing means to impulse said housing means, (d) said sealing member being movable away from said housing means after the impulsing operation to provide resultant large porting between said spindle means and said housing means.

References Cited by the Examiner

UNITED STATES PATENTS

| 2,564,212 | 8/51 | Ramsey | 192—58 |
| 3,116,617 | 1/63 | Skogg | 64—24 |

FOREIGN PATENTS

| 467,959 | 11/28 | Germany. |
| 417,193 | 10/34 | Great Britain. |

ROBERT C. RIORDON, *Primary Examiner.*